United States Patent
Lairson et al.

(10) Patent No.: US 7,378,164 B1
(45) Date of Patent: *May 27, 2008

(54) SOFT UNDERLAYER STRUCTURE FOR MAGNETIC RECORDING

(75) Inventors: Bruce Lairson, Los Altos, CA (US); Mourad Benakli, Shrewsbury, MA (US)

(73) Assignee: Maxtor Corporation, Longmont, CO (US)

( * ) Notice: Subject to any disclaimer, the term of this patent is extended or adjusted under 35 U.S.C. 154(b) by 319 days.

This patent is subject to a terminal disclaimer.

(21) Appl. No.: 11/008,712

(22) Filed: Dec. 9, 2004

Related U.S. Application Data

(63) Continuation of application No. 10/282,075, filed on Oct. 28, 2002, now Pat. No. 6,890,667.

(60) Provisional application No. 60/345,126, filed on Nov. 9, 2001.

(51) Int. Cl.
*G11B 5/667* (2006.01)
*G11B 5/673* (2006.01)

(52) U.S. Cl. .................... 428/828.1; 428/829; 428/830

(58) Field of Classification Search ............... None
See application file for complete search history.

(56) References Cited

U.S. PATENT DOCUMENTS

| | | |
|---|---|---|
| 5,270,291 A | 12/1993 | Sun et al. |
| 5,363,794 A | 11/1994 | Lairson et al. |
| 5,543,221 A | 8/1996 | Kitakami et al. |
| 5,603,766 A | 2/1997 | Visokay et al. |
| 5,822,153 A | 10/1998 | Lairson et al. |
| 5,834,085 A | 11/1998 | Lairson et al. |
| 5,909,340 A | 6/1999 | Lairson et al. |
| 5,942,342 A | 8/1999 | Hikosaka et al. |
| 6,645,647 B1* | 11/2003 | Litvinov et al. ............ 428/830 |
| 6,686,070 B1 | 2/2004 | Futamoto et al. |
| 6,890,667 B1* | 5/2005 | Lairson et al. ............ 428/611 |

(Continued)

FOREIGN PATENT DOCUMENTS

JP 61026927 A 2/1986

(Continued)

OTHER PUBLICATIONS

Tsuboi et al. English Translation of JP 10-228620 A, PTO 04-2291.

(Continued)

*Primary Examiner*—Kevin M. Bernatz
(74) *Attorney, Agent, or Firm*—Cesari and McKenna, LLP

(57) ABSTRACT

A magnetic recording medium having a soft magnetic underlayer structure that includes two soft underlayers is presented. A thick first soft underlayer, disposed on the medium substrate, is made of material which provides a low magnitude of magnetization saturation (Bsat) and high permeability. The first soft underlayer can be formed by plating or high-rate sputtering. The second soft underlayer, which has a lesser thickness than the first soft underlayer, is made of a material which provides a relatively high magnitude of Bsat and low permeability. The second soft underlayer can be formed by low-rate sputtering. The first soft under layer can be isolated from other layers in the medium by an exchange isolation layer. The second soft underlayer can be exchange coupled to a radial exchange pin layer disposed on the exchange isolation layer.

12 Claims, 5 Drawing Sheets

U.S. PATENT DOCUMENTS

| | | |
|---|---|---|
| 2002/0037439 A1 | 3/2002 | Litvinov et al. |
| 2002/0127433 A1 | 9/2002 | Shimizu et al. |
| 2002/0160230 A1 | 10/2002 | Yoshikawa et al. |
| 2003/0035973 A1 | 2/2003 | Trindade et al. |

FOREIGN PATENT DOCUMENTS

| | | |
|---|---|---|
| JP | 10-228620 A | 8/1998 |
| JP | 2001155322 A | 6/2001 |

OTHER PUBLICATIONS

JP Abstract Translation of JP 2001155322 A.
JP Abstract Translation of JP 10228620 A.
Machine Translation of JP 10228620 A.
JP Abstract Translation of JP 61026927 A.

* cited by examiner

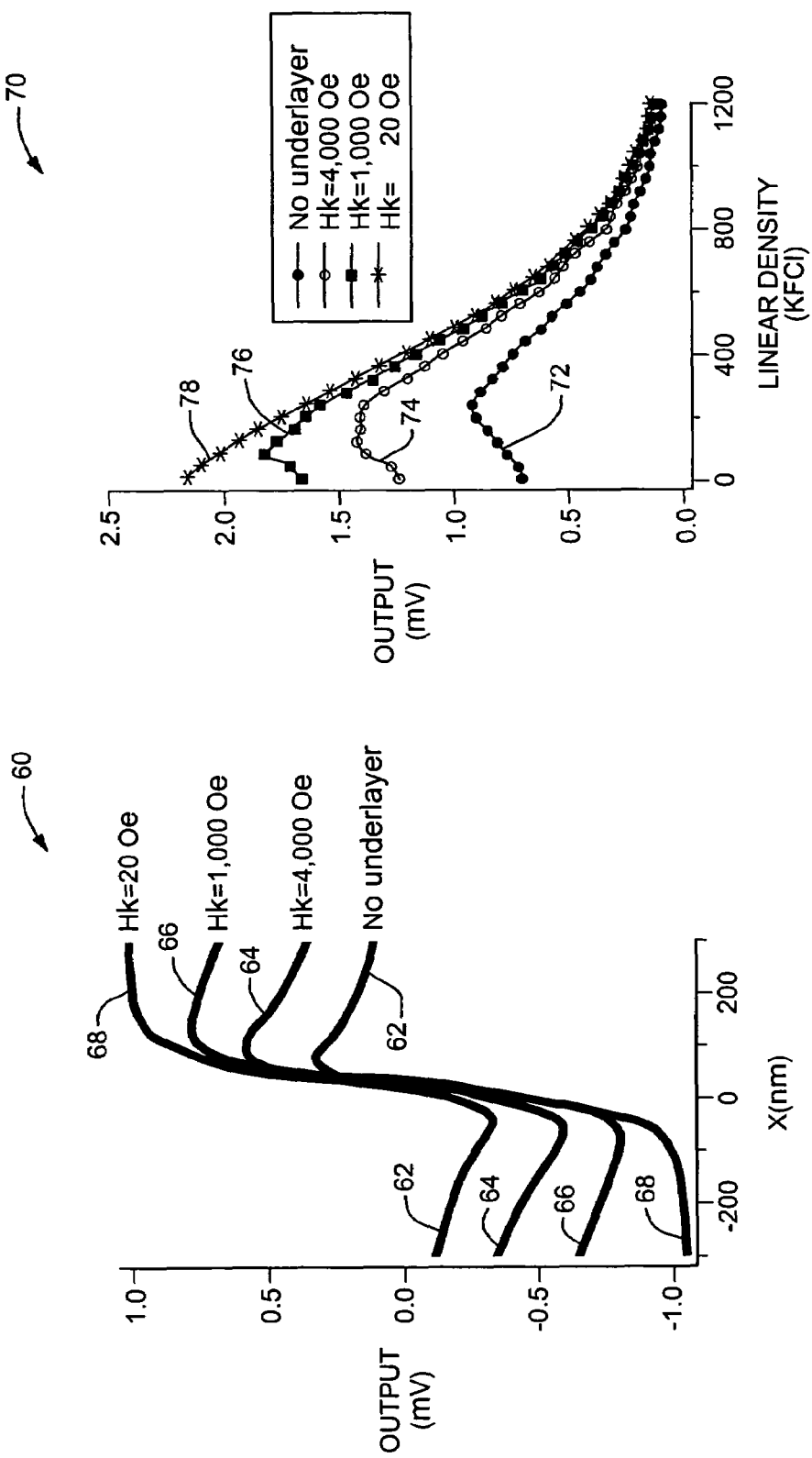

SOFT UNDERLAYER STRUCTURE FOR MAGNETIC RECORDING

CROSS REFERENCE TO RELATED APPLICATION

This application is a continuation of U.S. patent application Ser. No. 10/282,075, filed on Oct. 28, 2002, now U.S. Pat. No. 6,890,667, which claims priority to U.S. Provisional Patent Application Ser. No. 60/345,126, filed Nov. 9, 2001.

BACKGROUND

To support increases in the capacity of magnetic disk drives, magnetic recording media that are capable of recording data in higher planar densities are needed. While a high planar recording density is generally not achievable with some types of magnetic recording systems, perpendicular recording systems may provide such improvement.

Perpendicular recording systems record bits formed by a magnetic field in a direction that is perpendicular to the plane of a perpendicular magnetic recording medium having perpendicular magnetizing anisotropy, with adjacent bits being magnetized in the anti-parallel direction. The magnetic moments of adjacent bits stabilize each other, which allows an increase in coercive force and therefore contributes to high-density recording.

A conventional perpendicular magnetic recording medium is made up of a thick soft magnetic film (i.e., a soft underlayer) having a high permeability and a perpendicular recording layer having a high perpendicular anisotropy, typically separated by a spacer layer. One problem with the highly permeable, thick soft underlayer is that it is susceptible to the formation of domain walls, which produce noise at the time of recording and therefore adversely affects reproduction of data from the medium. The noise degrades the quality of readback data. Another problem is manufacturing cost. Typically, the soft underlayer material is applied to the substrate by a low-rate sputtering process. Because of the thickness of the material, the sputtering process can be time-consuming and therefore can be quite costly.

SUMMARY

In general, in one aspect, the invention is directed to a magnetic recording medium, such as a perpendicular or longitudinal medium, for use in a magnetic recording system. The recording medium includes a soft underlayer structure having a first soft underlayer and a second soft underlayer. The first soft underlayer is disposed on a substrate of the recording medium. The first soft underlayer and the second soft underlayer have respective first and second magnetization saturation values, the second magnetization value being substantially greater than the first magnetization saturation value. The recording medium also includes an exchange isolation layer disposed on the second soft underlayer and a recording storage layer disposed on the exchange isolation layer.

Embodiments of the invention may include one or more of the following features. The first soft underlayer may have a first thickness and the second soft underlayer may have a second thickness, the first thickness being chosen to be greater than the second thickness. The first thickness may be in a range of 0.05 to 5 microns and the second thickness may be less than 100 nm. The first and second soft underlayers may be separated by a radial exchange pinning layer disposed on an exchange isolation layer.

The second soft underlayer may comprise a material of low permeability. The material can be an iron alloy, for example, FeTaC, FeCo, FeTaN, FeAlSi, FeN, FeB, or FeCoB, or a material such as CoZrNb. The first soft underlayer may comprise a material of high permeability. The material can be, for example, Permalloy, NiP or NiFeMo. The first soft underlayer material can be applied to the substrate by a plating process or, alternatively, a sputtering process. The first magnetization saturation value can be less than 10,000 gauss and the second magnetization saturation value can be greater than 14,000 gauss.

In another aspect, the invention is directed to a disk drive system that includes a magnetic disk and a magnetic read/write device to write information on the disk and read the information from the magnetic disk. The magnetic disk includes a multi-layered structure. The multi-layered structure includes a soft underlayer structure having a first soft underlayer and a soft second underlayer. The first soft underlayer is disposed on a substrate of the magnetic disk. The first soft underlayer and the second soft underlayer have respective first and second magnetization saturation values. The second magnetization value is substantially greater than the first magnetization saturation value. The multi-layered structure further includes an exchange isolation layer disposed on the second soft underlayer and a recording storage layer disposed on the exchange isolation layer. The recording storage layer may include a perpendicular recording medium and/or a longitudinal recording medium.

Particular implementations of the invention may provide one or more of the following advantages. By replacing the single soft underlayer of conventional perpendicular recording media with multiple soft underlayers, various improvements that generally could not be realized with the single soft underlayer can be realized. That is, the second soft underlayer can be implemented for high magnetization saturation (Bsat), low permeability, and low susceptibility to achieve a fast readback response and noise reduction (through the reduction of domain walls) in the readback signals. The first soft underlayer, in contrast, can be implemented to provide low Bsat, with high permeability and high susceptibility for a low reluctance flux path. In addition, by splitting the structure into two separate layers, a thinner, high magnetization saturation (Bsat) layer and a thicker low Bsat layer, the cost of manufacturing the thicker layer can be reduced. That is, the thicker layer can be formed using plating or high-rate sputtering techniques, as opposed to the low-rate sputtering used by the conventional, single high Bsat soft underlayer.

Other features and advantages of the invention will be apparent from the following detailed description and from the claims.

BRIEF DESCRIPTION OF THE DRAWINGS

FIG. 4 is a graph showing head output (readback signal amplitude) as a function of soft underlayer thickness for various soft underlayer anisotrophy field values.

FIG. 5 is a graph showing head output (readback signal amplitude) as a function of linear density for various soft underlayer anisotrophy field values.

DETAILED DESCRIPTION

Figure 1:
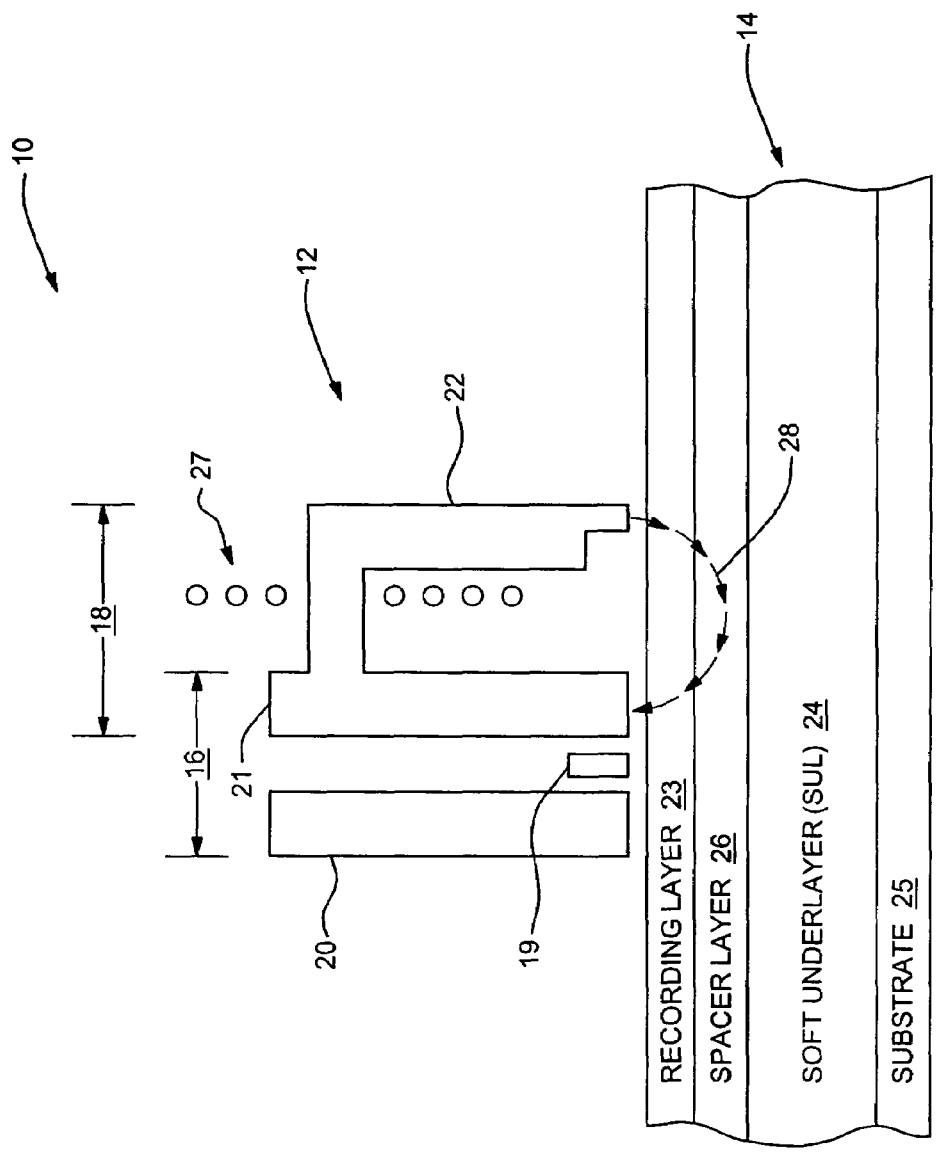
FIG. 1 is simplified diagram of a prior perpendicular recording system that includes a magnetic read/write head and a perpendicular magnetic recording medium having a single soft underlayer.

Referring to FIG. 1, a conventional perpendicular recording system 10 includes a read/write head device 12 and a perpendicular magnetic recording medium 14. The head device 12 includes a read portion 16 ("reader") and a write portion ("writer") 18. The reader 16 includes a magnetoresistive sensor 19 flanked by shields 20 and 21. The writer includes a top or write pole 22. The shield 21 of the reader 16 also serves as a return write pole for the writer 18. The medium 14 includes a recording layer 23 and a single soft magnetic layer 24, also known as a soft underlayer (or "SUL"), which is formed on a substrate 25. The recording layer 23 and the SUL 24 are separated by a non-magnetic spacer layer 26. During a write operation, coil 27 in writer 18 energizes write pole 22, causing flux to flow along write field flux path 28, returning to return write pole 21.

In general, the use of a SUL in perpendicular recording media serves three main objectives. First, the SUL causes the flux from the write head to be substantially perpendicular to the media plane. Second, the SUL increases the readback signal amplitude. Third, the SUL provides an easy, low reluctance path for returning the flux to the return write pole.

Realization of these objectives results in different, and to some extent, competing, optimizations. For instance, to satisfy the first objective, it is desirable to have a high magnetization saturation ("Bsat") value and radial magnetic orientation. This achieves fast grain switching in the soft underlayer so that high local fields at the head output are possible. In achieving the second objective, it is desirable to have radially oriented soft magnetic properties to generate a readback signal that is both large and quiet. With the formation of domain walls, the SUL becomes a source of noise during a readback operation. The readback signal amplitude is frequency dependent and typically larger at low frequencies. The larger the amplitude is, the greater the noise component is. To reduce readback signal noise, low susceptibility is favored. With respect to the third objective, providing the return flux path favors low conductance materials (to reduce eddy currents) and high flux carrying capacity, which requires high susceptibility such that the reluctance between the write pole and the return write pole is reduced. Reduction of this reluctance increases the write field amplitude for a given head current (magnetomotive force).

As noted earlier, a conventional SUL, such as SUL 24, is required to be thick and have a high value of Bsat. Because a high Bsat material is difficult to deposit, the material is applied to the substrate 25 by a low-rate sputtering process. For a thick material, the sputtering process can be quite time consuming and therefore drive up the overall manufacturing cost of the media.

The different soft underlayer optimizations discussed above, as well as an optimization that allows for a more inexpensive manufacturing process, can all be achieved by replacing the soft underlayer 24 of FIG. 1 with multiple underlayers, as described below with respect to FIG. 2.

Figure 2:
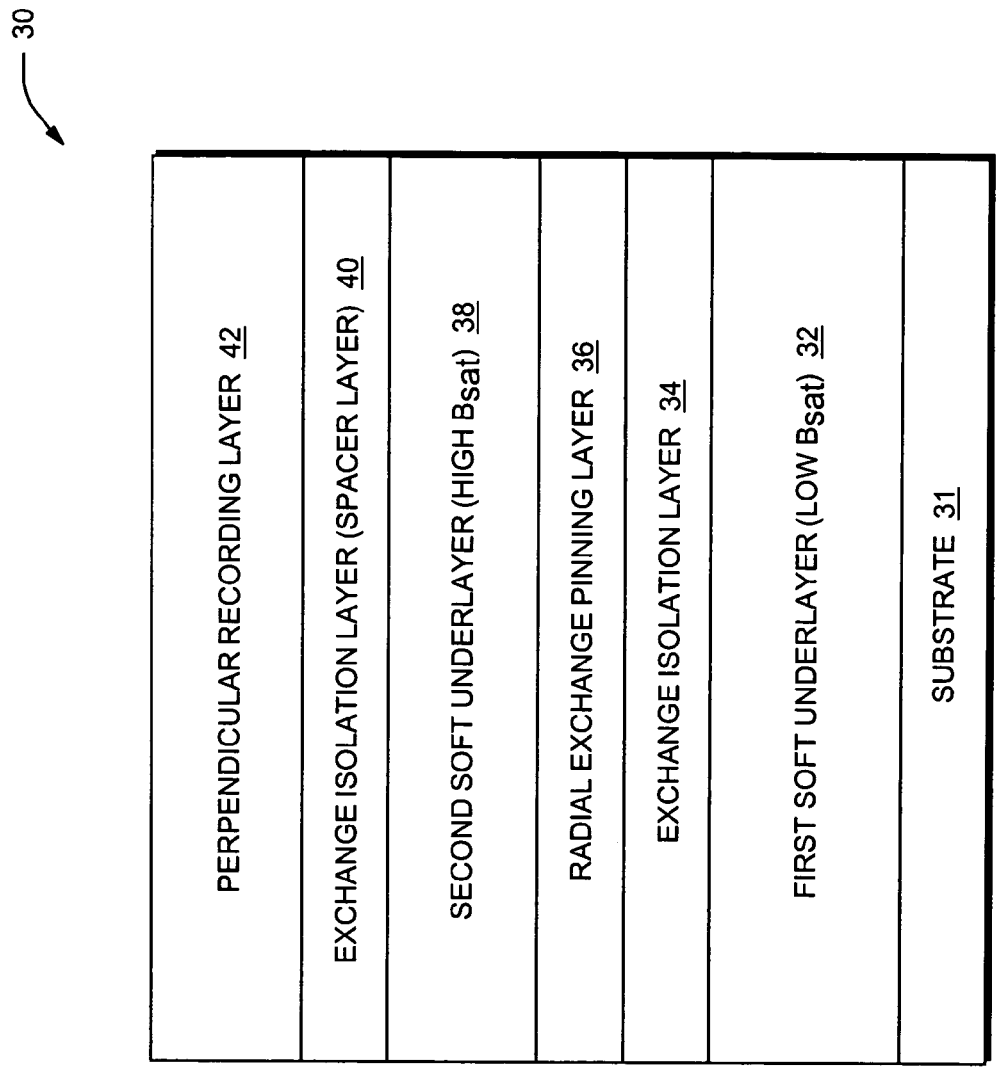
FIG. 2 is a detailed cross-sectional side view of a perpendicular magnetic recording medium having two soft underlayers.

Referring to FIG. 2, a magnetic recording medium 30 is shown (in a cross-sectional view). The layers of the medium 30, beginning with a substrate 31, include the following: the substrate 31, a first soft underlayer 32; an optional exchange isolation layer 34; a radial exchange pinning layer 36; a second soft underlayer 38 coupled to the radial exchange pinning layer 36; an exchange isolation layer 40; and a perpendicular recording storage layer 42. Thus, the medium 30 incorporates a two-layer soft underlayer structure including the first soft underlayer 32 and the second soft underlayer 38. The magnetization, Bsat, of the second layer 38 is chosen to be significantly higher than the magnetization of the first soft underlayer 32. In addition, the first soft underlayer 32 has a much greater thickness than that of the second soft underlayer 38. For example, the value of Bsat for the first soft underlayer 32 may be chosen as less than 10,000 gauss for a thickness in the range of 0.05 to 5 microns, while Bsat for the second soft underlayer 38 may be chosen as greater than 14,000 gauss for a thickness of less than 100 nm.

Because a low Bsat material is used in the thick first soft underlayer 32, that layer can be manufactured inexpensively through the use of such techniques as plating or high-rate sputtering. For example, a plated NiP with 6 At % phosphorous would result in a soft plated layer with a coercivity in the range of 2-20 Oe.

As mentioned earlier, the second soft under layer 38 has a high Bsat. A high Bsat means that the second soft underlayer can allow large perpendicular write fields and write field gradients. Low permeability is induced in this layer either by exchange coupling to the radial exchange pinning layer 36 or by radial anisotropy. Low permeability improves the frequency response of a head readback signal and reduces the sensitivity of a recording system that employs the medium 30 to media DC erase regions and stray fields.

Figure 3:
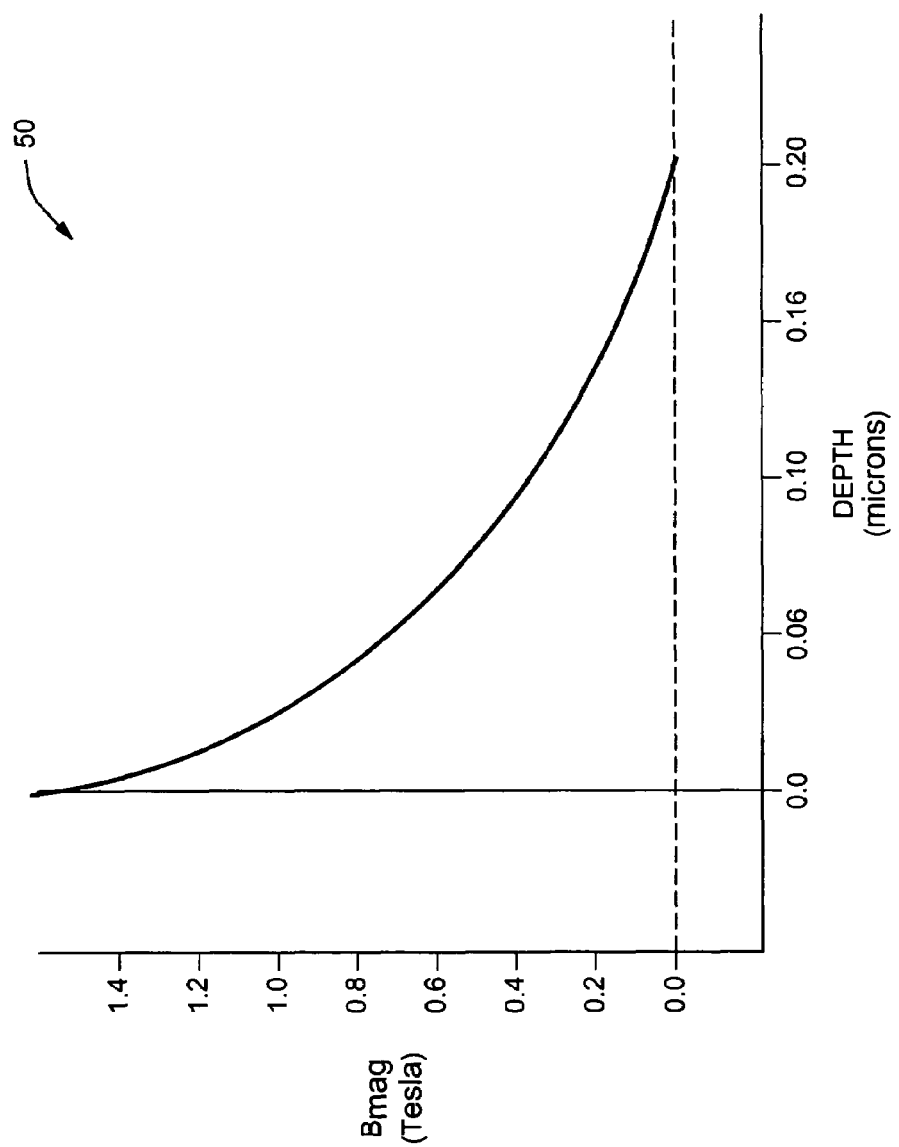
FIG. 3 is a graph showing magnetic field magnitude versus depth for a soft underlayer.

There is a relationship between the magnetization magnitude ("Bmag") for the strength of the magnetic field coming from the head and SUL thickness which can be used to select appropriate thicknesses for the two soft underlayers. FIG. 3 shows a graph of the magnetization magnitude versus SUL depth 50 in a 200 nm thick homogeneous soft underlayer for a 200 nm magnetic write width using a square write pole. It can be seen that, for the example shown, the soft underlayer must have a high Bsat, greater than about 1.3 Tesla, at the top surface. Further down in the soft underlayer, all of the flux can be carried by a material having a much lower Bsat, since the field dies rapidly with depth under the writer. For instance, at a depth of 80 nm, the magnetization magnitude is 0.4 Tesla, about ⅓ of the value of the top surface. Thus, by splitting a single soft underlayer (as shown in FIG. 1) into two separate soft underlayers, as shown in FIG. 2, one of the soft underlayers, specifically, the bottom soft underlayer 32, can be made of a thicker, much lower Bsat material (thus substantially improving the cost of the medium), and can be designed for high permeability, lower conductivity and increased granularity. The upper soft underlayer 38, on the other hand, can be of a lesser thickness and can be designed for low permeability to reduce the maximum amplitude of the readback signal.

Referring back to FIG. 2, the exchange isolation layer 34 decouples large domain walls and other magnetic defects of the thicker first soft underlayer 32 from the other layers of the medium. The radial exchange pinning layer 36 provides exchange pinning that imposes a radial orientation on the grains in the second soft underlayer 38. This coupling reduces the formation of domain walls in the second soft underlayer 38, thus making the medium more robust in the presence of stray fields. Stray fields of up to 100 Oe can exist in a PC or other drive application environments. Layers 34, 36 may be included in the medium 30, but are optional.

FIG. 4 shows a graph of readback signal amplitude as a function of thickness (X) for various values of the anisotrophy field Hk 60. The anisotropy field Hk is a function of the exchange coupled strength as well as SUL thickness. A curve 62 corresponds to a case in which no soft underlayer is utilized. Curves 64, 66 and 68 correspond to Hk values of 4,000 Oe, 1,000 Oe and 20 Oe, respectively. When no soft underlayer is used (curve 62), the output resembles a dipulse, while for an underlayer having high permeability ($\mu$=1000 Oe) and a low value of Hk, that is, Hk=20 Oe (curve 68), the output resembles a step.

The frequency content of these four cases can be examined with reference to FIG. 5, which shows a graph of readback signal amplitude versus linear density 70. The curves 72, 74, 76 and 78 correspond to the cases of "no underlayer", Hk=4,000 Oe, Hk=1,000 Oe and Hk=20 Oe, respectively. The curves show that the optimum readback for an underlayer implementation occurs when the permeability of the underlayer is approximately 5, e.g., for an Hk of 4,000 Oe (curve 72). The curve 76 for the case of an anisotropy field Hk of 1,000 Oe (which corresponds to a permeability of about 20) shows that the low frequency amplitude is reduced by about 20%, while the high frequency amplitude is unaffected. Thus, for higher values of Hk, and permeability greater than about 5, only the low frequency amplitude is increased. Such an increase in the low frequency amplitude is undesirable because it can induce non-linearities in the head output and because the noise in perpendicular media resides preferentially at low frequency. The data therefore suggests that the value of Hk be selected so that the second soft underlayer provides a reduced readback signal amplitude at lower frequencies where noise is most evident.

Given the above considerations, example materials that may be used for layers 32, 34, 36 and 38 are provided in TABLE 1 below.

TABLE 1

| LAYER | EXAMPLE MATERIALS |
|---|---|
| Soft Underlayer 1 | Permalloy; plated NiP with 2<P<8At%; NiFeMo |
| Exchange Isolation Layer | Any refractory nonmagnetic metal or oxide |
| Radial Exchange Pin Layer | PtMn; IrMn; NiMn; NiO; CoPt; CoPd |
| Soft Underlayer 2 | FeTaC; FeCo; FeTaN; CoZrNb; FeAlSi; FeN; FeB; FeCoB |

Figure 6:
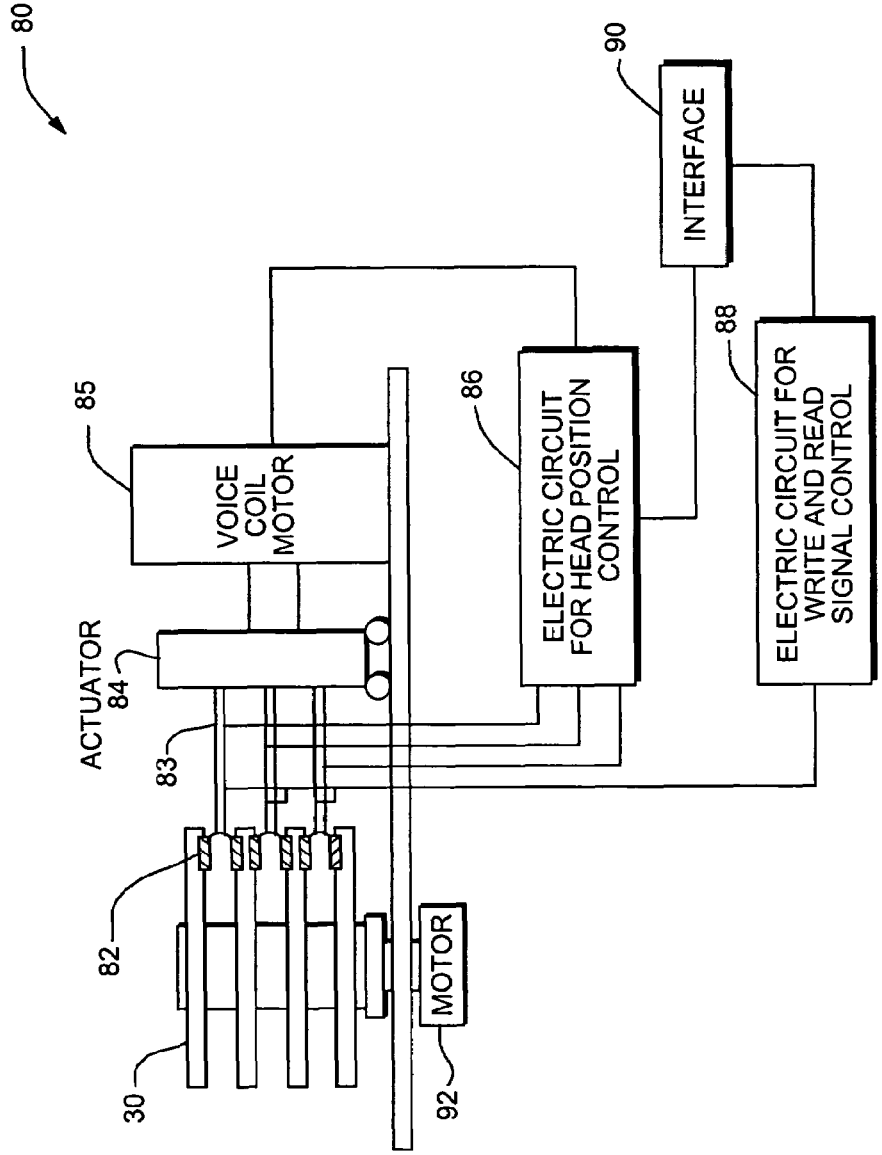
FIG. 6 is a schematic diagram of an exemplary magnetic disk drive system that employs one or more magnetic disks having the layered structure of the medium shown in FIG. 2.

FIG. 6 shows an embodiment of a magnetic disk drive system 80, which is constructed to include one or more of the magnetic recording medium 30 described above. Also included in system 80 are the following components: a magnetic head 82 (opposing to each magnetic recording medium 30), which reads from and writes to the magnetic recording medium 30; a suspension 83 to hold the magnetic head 82; an actuator 84; a voice coil motor 85 to drive the actuator 84; a head positioning circuit 86; a recording/reproducing circuit 88; an interface circuit 90; and a motor 92. Electrical signals from each magnetic head 82 are introduced to the recording/reproducing circuit 88. Electrical signals to and from the magnetic storage device 80 pass through the interface circuit 90. The magnetic recording medium 30 is driven by the motor 92.

Other embodiments are within the scope of the following claims. For example, the invention is not limited to use with perpendicular recording systems. Longitudinal recording systems record information in a direction that is longitudinal to the plane of the recording medium. Longitudinal media with soft underlayers may also be used in the manner described herein, in addition to, or instead of, perpendicular recording media.

What is claimed is:

1. A magnetic recording medium, comprising:
   a soft underlayer structure consisting of a first soft underlayer, a first exchange isolation layer, an exchange pinning layer and a second soft underlayer,
   the first soft underlayer being disposed on a substrate of the magnetic recording medium and having a first magnetization saturation value,
   the first exchange isolation layer being disposed on the first soft underlayer and decoupling domain walls and other magnetic defects of the first soft underlayer from other layers of the magnetic recording medium,
   the exchange pinning layer being disposed on the first exchange isolation layer; and providing exchange coupling with an adjacent magnetic layer,
   the second soft underlayer being disposed on the exchange pinning layer and exchange coupled to the exchange pinning layer, the second soft underlayer having a second magnetization saturation value, the second magnetization saturation value being greater than the first magnetization saturation value;
   a second exchange isolation layer disposed on the second soft underlayer; and
   a recording storage layer disposed on the second exchange isolation layer.

2. The magnetic recording medium of claim 1, wherein the exchange pinning layer is exchange coupled to the second soft underlayer in a radial direction.

3. The magnetic recording medium of claim 1, wherein the first soft underlayer has a first thickness and the second soft underlayer has a second thickness, the first thickness being greater than the second thickness.

4. A disk drive system comprising:
   a magnetic disk; and
   a magnetic read/write device to write information on the magnetic disk and read information from the magnetic disk;
   wherein the magnetic disk has a multi-layered structure comprising:
   a soft underlayer structure consisting of a first soft underlayer, a first exchange isolation layer, an exchange pinning layer and a second soft underlayer,
   the first soft underlayer being disposed on a substrate of the magnetic recording medium and having a first magnetization saturation value,
   the first exchange isolation layer being disposed on the first soft underlayer and decoupling domain walls and other magnetic defects of the first soft underlayer from other layers of the of the multi-layered structure,
   the exchange pinning layer being disposed on the first exchange isolation layer and providing exchange coupling with an adjacent magnetic layer,
   the second soft underlayer being disposed on the exchange pinning layer and exchange coupled to the exchange pinning layer, the second soft underlayer having a second magnetization saturation value, the second magnetization saturation value being greater than the first magnetization saturation value;
   a second exchange isolation layer disposed on the second soft underlayer; and a recording storage layer disposed on the exchange isolation layer.

5. The disk drive system of claim 4, wherein the exchange pinning layer is exchange coupled to the second soft underlayer in a radial direction.

6. The disk drive system of claim 4, wherein the first soft underlayer has a first thickness and the second soft underlayer has a second thickness, the first thickness being greater than the second thickness.

7. A magnetic recording medium, comprising:
a two-layer soft underlayer structure consisting of a first soft underlayer, a second soft underlayer disposed over the first soft underlayer, and at least one layer not of a soft magnetic material, the first soft underlayer having a first magnetization saturation value and the second soft underlayer having a second magnetization saturation value greater than the first magnetization saturation value;
a first exchange isolation layer disposed between the first and second soft underlayers, on the first soft underlayer, the first exchange isolation layer decoupling domain walls and other magnetic defects of the first soft underlayer from other layers of the magnetic recording medium;
an exchange pinning layer disposed between the first and second soft underlayers, on the first exchange isolation layer, the exchange pinning layer providing exchange coupling with the second soft underlayer, the second soft underlayer being exchange coupled to the exchange pinning layer;
a second exchange isolation layer disposed on the second soft underlayer; and
a recording storage layer disposed on the second exchange isolation layer.

8. The magnetic recording medium of claim 7, wherein the exchange pinning layer is exchange coupled to the second soft underlayer in a radial direction.

9. The magnetic recording medium of claim 7, wherein the first soft underlayer has a first thickness and the second soft underlayer has a second thickness, the first thickness being greater than the second thickness.

10. A disk drive system comprising:
a magnetic disk; and
a magnetic read/write device to write information on the magnetic disk and read information from the magnetic disk;
wherein the magnetic disk has a multi-layered structure comprising:
a two-layer soft underlayer structure consisting of a first soft underlayer, a second soft underlayer disposed over the first soft underlayer, and at least one layer not of a soft magnetic material, the first soft underlayer having a first magnetization saturation value and the second soft underlayer having a second magnetization saturation value greater than the first magnetization saturation value;
a first exchange isolation layer disposed between the first and second soft underlayers, on the first soft underlayer, the first exchange isolation layer decoupling domain walls and other magnetic defects of the first soft underlayer from other layers of the magnetic recording medium;
an exchange pinning layer disposed between the first and second soft underlayers, on the first exchange isolation layer, the exchange pinning layer providing exchange coupling with the second soft underlayer, the second soft underlayer being exchange coupled to the exchange pinning layer;
a second exchange isolation layer disposed on the second soft underlayer; and
a recording storage layer disposed on the exchange isolation layer.

11. The disk drive system of claim 10, wherein the exchange pinning layer is exchange coupled to the second soft underlayer in a radial direction.

12. The disk drive system of claim 10, wherein the first soft underlayer has a first thickness and the second soft underlayer has a second thickness, the first thickness being greater than the second thickness.

* * * * *